United States Patent [19]
Askey et al.

[11] 3,805,533
[45] Apr. 23, 1974

[54] FIXING ELEMENTS

[75] Inventors: Arthur Askey, Doncaster; John Michael Murphy, Mansfield, both of England

[73] Assignee: Explosives and Chemical Products Limited, London, England

[22] Filed: July 24, 1972

[21] Appl. No.: 274,651

[30] Foreign Application Priority Data
Aug. 19, 1971 Great Britain.................... 39067/71

[52] U.S. Cl....................... 61/45 B, 52/698, 52/741
[51] Int. Cl............................................. E21d 20/02
[58] Field of Search....... 61/45 B; 52/698, 725, 741; 85/63, 65

[56] References Cited
UNITED STATES PATENTS
3,618,326  11/1971  Montgomery...................... 61/45 B
3,430,449  3/1969   Novotny et al..................... 61/45 B
3,702,060  11/1972  Cumming........................... 61/45 B
3,699,687  10/1972  Bourland........................... 61/45 B Primary Examiner—J. Karl Bell
Attorney, Agent, or Firm—Larson, Taylor & Hinds

[57] ABSTRACT

In the method of consolidating rock strata which involves securing, in an oversized borehole drilled therein, a fixing element such as an anchor bolt by means of a synthetic resin-based composition contained in one or more frangible cartridges which are destroyed in the borehole by the rotation of the fixing element, there is employed a longitudinally extending fixing element having a shank which is provided with a longitudinally extending collar so as to reduce the volume of the annular space between the fixing element and the wall of the borehole, so that the required amount of said composition and hence of the relatively expensive synthetic resin can be reduced or used more effectively.

20 Claims, 19 Drawing Figures

FIXING ELEMENTS

This invention relates to fixing elements such as anchor bolts capable of being secured in oversized boreholes by means of a resinous composition.

The use of resin secured fixing elements for mine roof support has gained considerable world-wide acceptance in recent years, particularly as a result of the use, in conjunction with the fixing elements, of one or more frangible cartridges containing a synthetic resin-based composition which are inserted into a borehole for the fixing element and are then destroyed therein by rotating the fixing element in the borehole whilst in contact with the cartridges, so as to cause the contents of the cartridges to be mixed and displaced into the annular space between the fixing element and the wall of the borehole. Curing of the synthetic resin takes place in situ with the result that the fixing element is secured in the borehole. However, the commercial development of this technique has been retarded to some extent by certain economic difficulties. These are principally related to the relatively high cost of the resinous composition required to fill the annular space between the fixing element and the wall of the borehole drilled to receive it. Ideally, the aim should be to secure a fixing element in a borehole of only slightly larger diameter, for example, a 22mm. diameter bolt is ideally suited to a borehole diameter between 25mm. and 28mm. In larger boreholes a 22mm. bolt becomes progressively less economical as more and more resin is required to fill the annulus. One approach to the problem has been to develop drilling equipment capable of drilling relatively small diameter boreholes, but there are severe limitations on this approach in the soft ground conditions frequently encountered in the coal mining industry. Basically two systems have evolved, the first being suitable primarily for those situations where it is impossible to drill a small diameter borehole, the second only for situations where small diameter boreholes can be drilled in the rock. In the first system, which may be referred to as the partial bonding system, a relatively short length of the fixing element is secured at the inner end of the borehole by means of a resinous composition initially contained in one or more frangible cartridges inserted in the borehole ahead of the element, and after curing of the resulting resin plug, the fixing element is tensioned by means of a heavy bearing plate and a nut at the outer end of the element. Typically, 15 percent of the total length of the fixing element may be resin bonded at the inner end and the remainder of the element remains free in the borehole. In the second system, which may be referred to as the total bonding system, the annulus between the fixing element and the borehole is totally filled with resinous composition, so that the whole length of the fixing element is fully secured. For most applications the second system is preferred by owing to the difficulty of drilling the small diameter boreholes, the first system has tended to be used more extensively, although technically it is inferior. Consequently, attempts have been made to secure tubular fixing elements, rather than simple bolt fixing elements, so that even in a large diameter hole the annulus may be kept to a minimum. This approach has proved to be of technical value but continues to suffer from economic disadvantages in that the cost of tubular fixing elements is high relative to that of bolt fixing elements of similar bearing capacity.

When the borehole diameter is not more than 10mm. greater than the diameter of the fixing element, i.e. when using the total bonding system, it is generally not necessary to provide special deformation of the anchor end of the element to ensure adequate mixing of the contents of the frangible cartridge used to secure the element in the borehole. For these situations where only relatively large diameter holes can be bored so that the borehole diameter is more than 10mm. greater than the fixing element diameter, i.e. when using the partial bonding system, it is essential to provide some deformation of the anchor end of the element to ensure that the reactive components within the cartridge are mixed sufficiently when the element is rotated. Fixing elements equipped with stirrer paddle anchor ends to ensure adequate mixing of the reactive components of the resinous composition contained in the frangible cartridge have therefore been employed. Other types of fixing elements have also been employed with which the mixing has been achieved by means of a twisted scroll or a simple "pigtail" deformation of the anchor end of the element or by means of a forged conical enlargement of the anchor end. In general, the types commercially available are able to provide, in the partial bonding system, adequate mixing and adequate anchorage in the cured resinous composition under optimum conditions. They have a common disadvantage, however, in that the annular volume required to be filled by the mixed resinous composition is relatively large and furthermore it is possible to force any one of the abovementioned types of anchor ends, with the exception of the forged cone, through the resinous cartridges without adequately mixing the contents thereof.

It is an object of the present invention to enable a fixing element such as an anchor bolt of relatively small diameter to be secured in a relatively large diameter borehole in a manner such as to obtain at least one of the advantages of the total bonding system whilst avoiding or at least mitigating one or more of the disadvantages mentioned above in connection with the partial bonding system.

Thus in accordance with one aspect of the present invention, there is provided a method of securing a longitudinally extending fixing element in a borehole which is substantially oversized in relation to the fixing element, in which a resinous composition packaged in one or more frangible cartridges and positioned within the borehole is used to secure the fixing element in the borehole, characterised in that to reduce the amount of resinous composition required to secure the fixing element in the borehole, at least that part of the fixing element which is to be secured in the borehole is provided with at least one longitudinally extending collar which reduces the volume of the annular space between the fixing element and the wall of the borehole.

In accordance with another aspect of the invention, there is provided a fixing element suitable for use in the method of the invention, the fixing element comprising a shank at least one end portion of which is provided with at least one longitudinally extending collar.

The collar may be a loose fit on the shank so that on tensioning the resin-secured fixing element the load is transferred to the end of the element. Alternatively, the collar may be firmly bonded to, or immovably fitted on, the shank so that optimum restraining forces may be applied by the fixing element to regions of high stress concentration along the secured length.

The collar may be solid or hollow. When the collar is solid, it is advantageously located in position on the shank by means of a fixed washer positioned on the shank and suitable retaining means positioned at the said one end, i.e. the anchor end, of the shank, preferably a free washer retained in position by a nut or an appropriately shaped shank head. In the case of a hollow collar, this may be provided with a closed end having an aperture therethrough through which the shank can pass, the collar being retained in position by means of a nut and free washer co-operating with a threaded washer located within the hollow collar adjacent said aperture.

The collar may be made from any suitable material, for example, wood, metal, cementitious or plaster based compositions, or synthetic thermoplastic or thermosetting resins, e.g. high density polyethylene.

The collar may be of substantially uniform cross-sectional area. However, to increase the load bearing capacity of the fixing element particularly in the case where only a short length of the element is secured by resinous composition, it is preferable for the collar to be of decreased cross-sectional area in the region adjacent the anchor end of the shank, so as to enable more of the resinous composition to come into contact with the free washer or shaped shank head. Alternatively the collar may be tapered towards the anchor end of the shank.

The shank may be of substantially circular cross-section and may be formed, for example from a steel bar. However, it is advantageous to use as the shank a rod of reinforced plastics material, for example a rod of glass fibre reinforced polyester resin, rather than a metallic shank such as a steel bar in situations in which the use of a metallic shank would be disadvantageous, for example in restraining high shear forces in rock adjacent to coal seams where the use of a metallic shank in the fixing element might interfere with the operation of coal cutting machinery. Likewise the shank may be formed of wood, in which case the collar or collars may advantageously be formed of reinforced plastics material, for example glass fibre reinforced polyester resin.

The shank may, if desired, have a cross-section other than circular, for example the cross-section of the shank may be triangular, square, hexagonal or I-shaped.

In one preferred embodiment of the invention, the collar is formed integrally with the shank. This may be achieved by forming the collar from a castable synthetic resin which is cast on to the shank, i.e. on to substantially the whole length of the shank or on to at least the anchor end of the shank, said anchor end being deformed or provided with a screw-thread so as to ensure in use adequate load transfer between the shank and the collar. The exterior surface of the cast resin collar may be shaped so as to provide maximum mechanical interlock between the collar and the resinous composition used for securing the fixing element in the borehole. Furthermore, the conformation of the collar at the anchor end of the shank may be designed to facilitate entry of the fixing element into the frangible cartridge or cartridges employed with the fixing element and thereby minimise the thrust required to insert the fixing element.

The cast resin collar may be employed not only with a shank of circular cross-section but also with shanks of non-circular cross-section as previously mentioned. In the case of the latter, the cast resin collar does not necessarily have to completely encase the shank.

The integral collar is advantageously cast from an unsaturated polyester resin formed by condensation of a polyol such as a glycol, for example propylene glycol, with an unsaturated polybasic acid or anhydride, for example maleic anhydride, and preferably a saturated or aromatic dicarboxylic acid or anhydride, for example phthalic anhydride, and addition to the product of an unsaturated polymerisable monomer, for example styrene. The monomer may be added in an amount of, for example, from 25 to 90 percent by weight of the condensation product. The polyester resin will normally contain one or more inorganic fillers, for example silica, talc, slate, fly-ash or limestone, preferably in powder form, in an amount of for example, up to 90 percent by weight of the total resin. Such polyester resins are cured with a polymerisation catalyst such as, for example, benzoyl peroxide, typically present in an amount of from 0.1 to 5 percent by weight of resin, in the presence of an accelerator such as, for example, dimethylaniline, typically present in an amount of from 0.1 to 2 percent by weight of resin.

For a better understanding of the invention, reference will now be made, by way of example, to the accompanying drawings which illustrate various embodiments of the fixing element of the invention.

Figure 1:
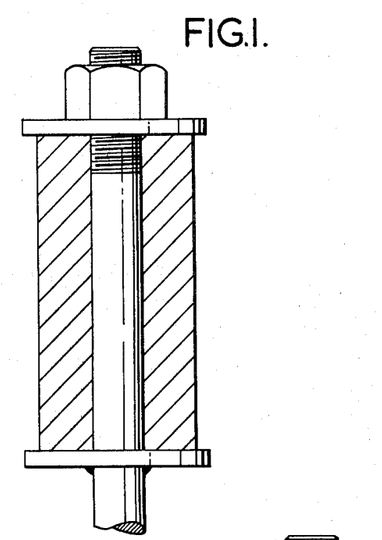

Referring firstly to FIG. 1, there is illustrated therein in part cross-section the end portion of an anchor bolt formed from a 19mm. diameter steel bar with rolled thread at each end, fitted on the inner end for a length of 250mm. with a wooden tubular collar of outside diameter 36mm. The collar is located on the end of the bolt by means of a fixed washer welded to the steel bar and by means of a free washer and a nut at the anchor end of the bolt. The free washer diameter is 41mm. and the anchor bolt as illustrated is designed for insertion into a 43mm. diameter borehole. In use a single resinous cartridge such as that disclosed in British Patent Specification No. 1,127,913 is inserted into the borehole ahead of the anchor bolt. The bolt is then inserted and used to push the cartridge to the end of the borehole. At this stage the anchor bolt is rotated at a speed of from 100 to 1,000 r.p.m. to break the frangible cartridge containing resinous composition. The anchor bolt is then forced home to the end of the borehole while continuing rotation, so that the resinous composition is thoroughly mixed and displaced into the annular space between the wooden tubular collar and the wall of the borehole. The resin cures rapidly and the bolt may be tensioned within four minutes of insertion in the manner described. It has been found impossible to manually thrust the anchor bolt through the cartridge without simultaneous rotation so that there can be no possibility of inadequate mixing of resinous composition on insertion of a bolt of this type. On applying a tensile load to the central steel bar, the total load is carried on the nut at the inner end of the bolt and is transmitted through the free washer to the annular sleeve of cured resinous composition. In this way the maximum benefit is achieved from the secured length of the bolt since effectively the total load is applied in compression from the rear of the borehole to the bonded annular sleeve of resin.

Figure 2:
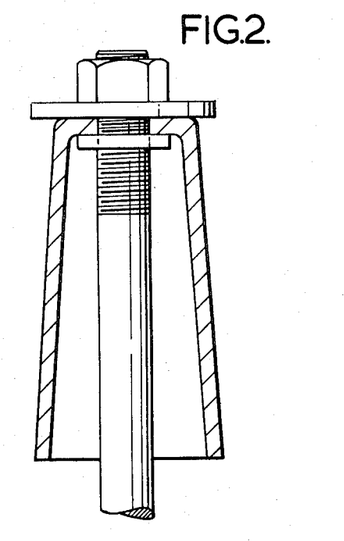

From the foregoing it will be appreciated that at least in the case of short anchored fixings, it is advantageous to ensure that an adequate lip is preserved at the inner end of the borehole so that the load transmitted through the free washer is distributed over an adequate surface of cured resin. For this purpose it is advantageous to use a tapered collar so that maximum gap filling is achieved, together with maximum load bearing contact surface area between the free washer and the resinous composition. A suitable tapered collar is illustrated in FIG. 2, the collar consisting of an injection moulded, high density polyethylene tapered collar, secured to the anchor end of the bolt by means of a threaded washer within the moulded component, and a free washer and nut as used in the embodiment shown in FIG. 1. Using such a collar it is possible to arrange that the wider end of the tapered collar is fully in contact with the wall of the borehole so that in use the anchor bolt is secured in position by means of a tapered cylinder of cured resin bonded over its total external surface to the wall of the borehole. As in the embodiment of FIG. 1, the load is carried through the nut and free washer at the end of the bolt and therefore, the gap filling collar may itself be of relatively weak construction since it has to withstand merely the imposed loads of insertion and is not required to carry any of the subsequent applied tension to the bolt.

Figure 3:
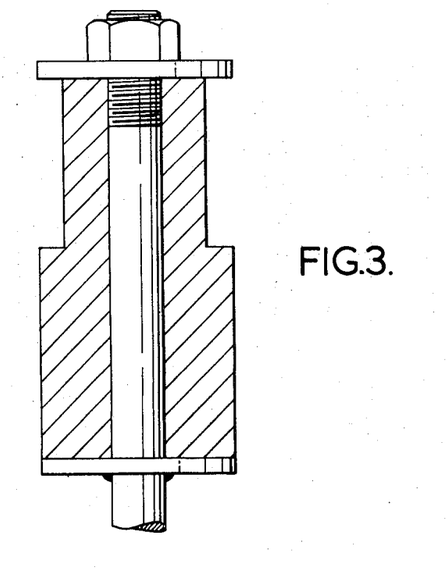

An alternative means of ensuring adequate load bearing surface below the terminal nut and washer, while retaining maximum gap filling characteristics, is illustrated in FIG. 3. The wooden collar of maximum diameter 41mm. is turned down to 36mm. for a portion of the length situated immediately below the load bearing washer.

Figures 4, 6:
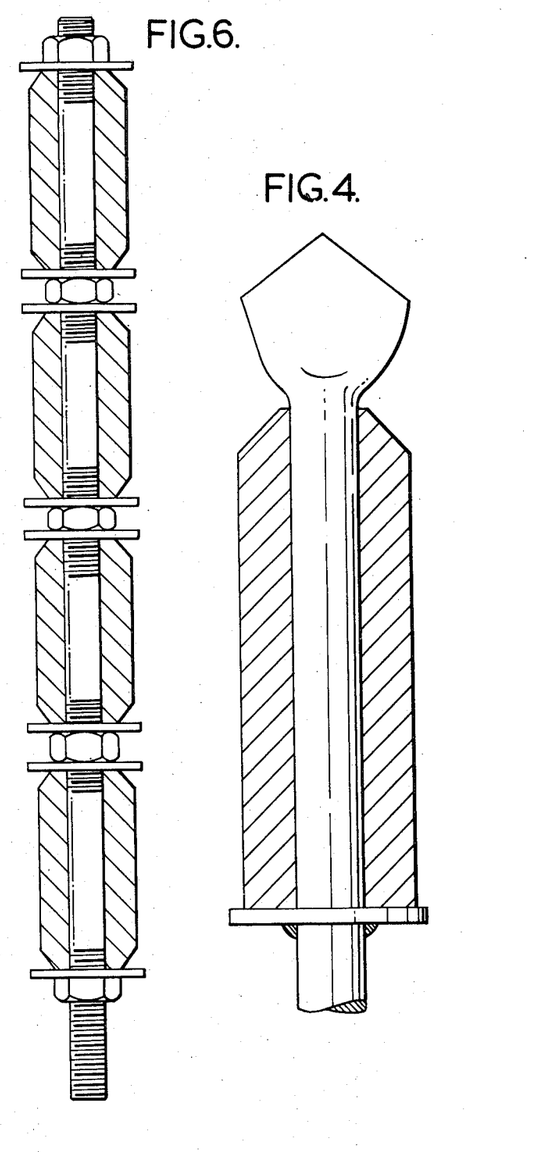

Although the simple nut and washer load bearing end is suitable in most cases, if desired quite adequate bolt ends may be produced by simple end forging techniques. FIG. 4 illustrates such an embodiment having a forged conical head, but alternatively simple upset bolt head ends may be used.

With the known forged paddle or scroll type anchor bolts, it has hitherto been necessary to supply a range of botls to suit the range of hole sizes drilled throughout the mining and civil engineering industries. With the anchor bolts of the invention having a simple nut and washer load bearing end, it is possible to supply a single threaded bolt and nut which can be fitted on site with a gap filling collar and washer to suit the available hole size. Thus for a standard 19 mm. bolt and nut the following range of sleeves may be supplied.

| Hole Size | Load Washer Size | Tapered Collar Size |
| --- | --- | --- |
| 35mm. | 33mm. | 31/34mm. |
| 43mm. | 41mm. | 36/41mm. |
| 50mm. | 48mm. | 44/48mm. |
| 60mm. | 58mm. | 54/58mm. |

Figure 5:
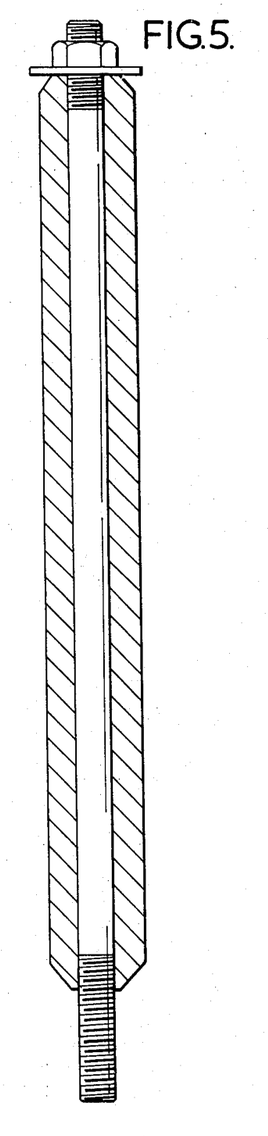

The present invention may also be employed to achieve the advantages of full resin bonding, even in large diameter holes. A suitable collar may be bonded to the bolt over its whole length as illustrated in FIG. 5 of the accompanying drawings, thereby permitting subsequent full bonding of the bolt with a relatively small quantity of resinous composition. For example, a 19mm. steel bar surrounded by a bonded wooden collar of 36mm. outside diameter may be inserted into a 43mm. borehole, using only 1,500 g. of resinous bonding composition, whereas to similarly bond a 3/4 inch diameter bar without a collar into the same borehole would require more than 4,000 g. of the same resinous composition. By ensuring that the gap filling collar is adequately bonded to the steel bar, it is possible to obtain all the recognised benefits of full column resin bolting, i.e., maximum localised restraining force upon laminated strata beds combined with controlled extension of the bolt beyond the yield point.

An alternative method of ensuring that restraining forces are relatively localised is illustrated in FIG. 6 of the accompanying drawings. The bolt rod is fully threaded and a number of relatively short collars are secured along the length of the rod. A load bearing free washer and nut are located between each pair of collars so that effectively the bolt is sub-divided into relatively short lengths, each of which is able to apply the maximum restraining force of the bolt to localised imposed stresses. Similar elements may be produced in which the load bearing component between each pair of collars consists of a single washer either welded or crimped to the centre smooth bolt rod.

Figure 7:
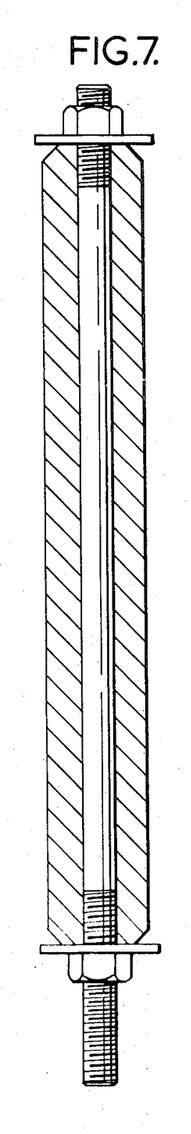

Instead of the collar being bonded to the bolt, it may merely be retained in position upon the rod by means of a welded washer or preferably a nut and free washer as illustrated in FIG. 7. In this case similar resin economy may be achieved with adequate ground support in some circumstances. High localised retaining stresses may not be achieved since on stressing the bolt at a point along its bonded length, the load will be effectively trnasmitted to the nut at either end of the collar and the full elasticity of the bolt length will be employed in restraining ground movement. In some circumstances this could prove to be an advantage, particularly in very weak ground where the load distribution provided by the bonded sleeve of resin could be technically superior to the higher local stress concentrations produced in a tightly bonded system. Thus, the basic collar system of the present invention may be supplied with a high degree of flexibility to varying ground conditions to give optimum performance.

Figure 8:
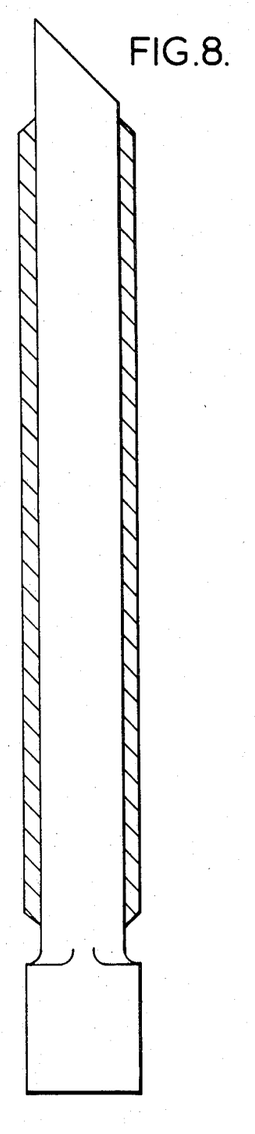
Figure 9:
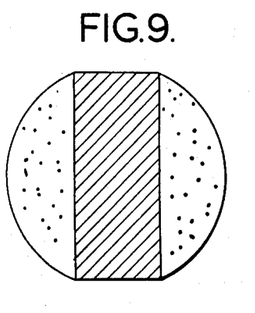
Figure 10:
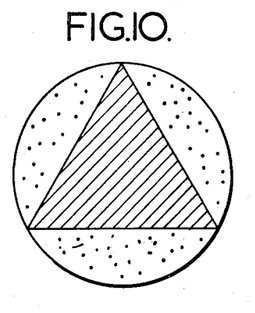
Figure 11:
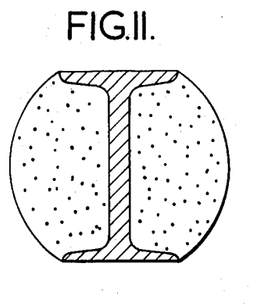
Figure 12:
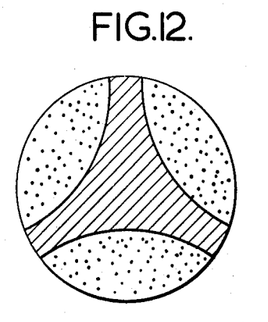
Figure 13:
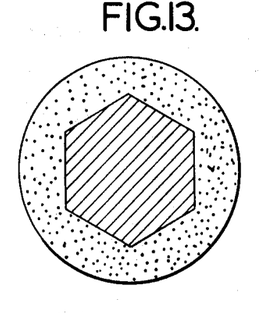
Figure 14:
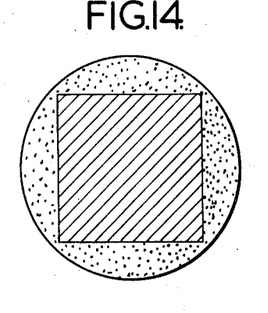
Figure 15:
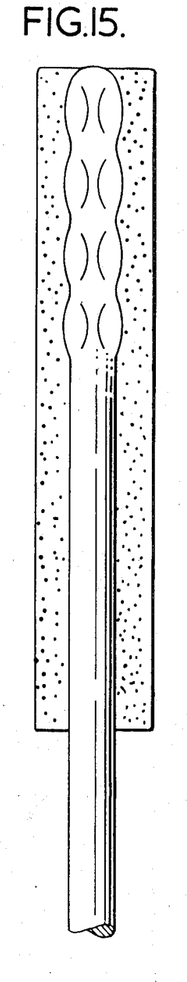
Figure 16:
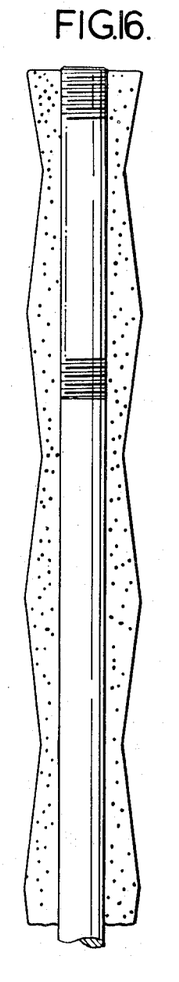

FIG. 8 of the drawings shows, in longitudinal cross-section, a fixing element comprising a wooden dowel having a diameter of 30mm. which is surrounded by a sheath formed from glass fibre reinforced polyester resin, so that the fixing element has an overall diameter of 36mm. and is therefore suitable for insertion into a 43mm. diameter borehole.

FIGS. 9 to 14 of the drawings show, in horizontal corss-section, examples of fixing elements in accordance with the invention each having an integral cast resin collar and in which the shank has a non-circular cross-section. As will be seen from FIGS. 9, 10, 11 and 12, the resin collar does not completely encase the shank, whereas in FIGS. 13 and 14 it does.

Figure 17:
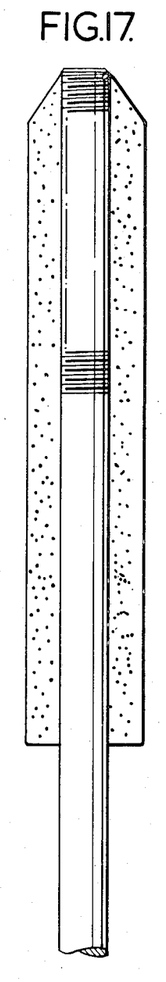
Figure 18:
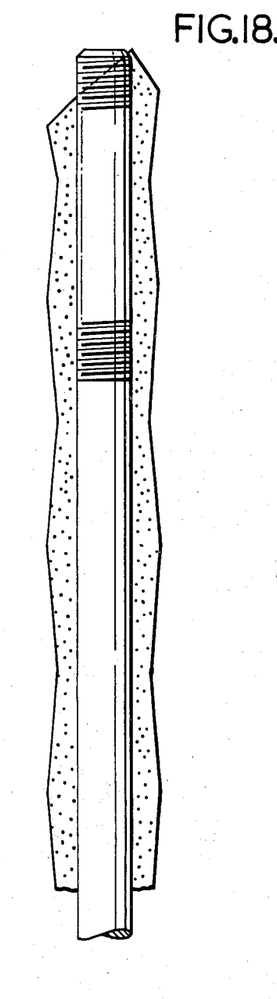

Examples of fixing elements having cast synthetic resin collars on at least their anchor end portions are illustrated in FIGS. 15, 16 17 and 18 of the accompanying drawings. As will be seen from FIGS. 16 and 18, the exterior surface of the cast resin collar is shaped to improve the mechanical interlock between the collar and the resinous composition used to secure the fixing element in the borehole, whilst FIGS. 17 and 18 show the collar as having a conformation at the anchor end of the fixing element which will facilitate entry into a resinous cartridge located in the borehole.

Whilst designed primarily for use with multi-component cartridges of synthetic resin based compositions, the fixing elements of this invention may also be used with premixed organic or inorganic cements injected into the borehole either before or after insertion of the fixing element. Multi-compartment capsules containing compositions based on hydraulic cements or plasters, either along or in admixture with synthetic resins, may also be used in conjunction with these fixing elements.

The following Examples further illustrate the invention.

EXAMPLE 1

An anchor bolt similar to that illustrated in FIG. 5 was produced in the following manner:

A steel bar 60 inches in length and 19mm. in diameter was roll threaded for 2 inches at one end and for 4 inches at the other end. A nut and free washer were then fitted on the shorter roll threaded end. The maximum diameter of the washer was 41mm. Two strips of half round timber, each 56 inches in length and 36mm. in diameter, were machined with a longitudinal hemispherical groove of 20mm. diameter so that when clamped around the bar they formed a loosely fitting cylinder of wood 36mm. in overall diameter. The two grooved wooden strips were coated internally with a filled unsaturated polyester resin adhesive and then clamped around the bar so that when the adhesive cured the wooden cylinder was firmly bonded to the steel bar.

Figure 19:
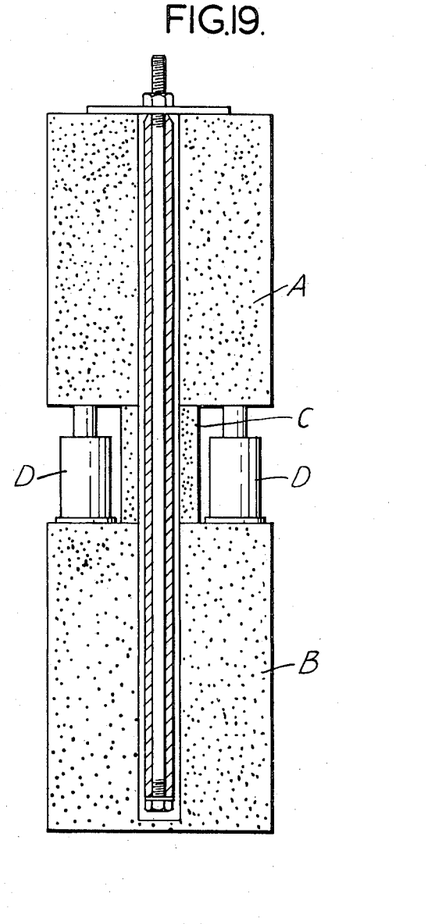

Three concrete blocks were arranged as illustrated in FIG. 19 of the accompanying drawings. The blocks A and B were each 24 inches in length and 18 inches in diameter and the block C was 10 inches in length and 6 inches in diameter. Blocks A and B were heavily reinforced with steel mesh and cast from concrete of 5,000 lbs. p.s.i. compressive strength. A centre hole 43mm. in diameter was bored in the blocks as illustrated. Two-component resinous cartridges of the type described in British Patent Specification No. 1,127,913 and of total weight 1 kg., were inserted into the test borehole and the anchor bolt described above was inserted while rotating it at a speed of 500 r.p.m. The anchor bolt was pushed steadily to the full depth of the borehole, thereby breaking the resinous cartridges and mixing the contents thereof and totally filling the annular space between the wooden collar and the wall of the borehole with the resulting mixed resinous composition. After curing for 1 hour a tensile test load was applied with the two hydraulic rams D to force the upper block away from the lower block and thereby tension the restraining anchor bolt. No movement of the two blocks could be detected up to the yield point of the central bar at approximately 11 tons. Beyond that point the central bar elongated and became progressively debonded from the surrounding wooden collar. Continued application of load caused progressive elongation of the central bar in the manner characteristic of fully bonded smooth steel bolts. The total elongation was 7 inches when ultimate tensile failure of the bolt occurred at a load of 23 tons.

EXAMPLE 2

An anchor bolt as illustrated in FIG. 1 was manufactured in the following manner:

A steel bar 5¼ feet in length and 19mm. in diameter was roll threaded for 2 inches one end and 4 inches at the other end and fitted with a tack welded retaining washer at a distance of 11 inches from the extremity of the shorter rolled end. A wooden cylinder 36mm. in outside diameter with a centrally bored hole of 21mm. diameter and 10 inches in length, was fitted over the bar so that it rested on the track welded retaining washer. A free washer and nut were then attached to the end of the bar to lightly compress the wooden cylinder against the retaining washer. The free washer had an outside diameter of 41mm. so that it overlapped the wooden cylinder by a radial distance of 2.5mm.

A hole 43mm. in diameter was bored into a sandstone rock to a depth of 5 feet. A single resinous cartridge of the type described in British Patent Specification No. 1,127,913 and 300 g. in weight, was inserted into the borehole and pushed to the end of the hole by means of the anchor bolt described above. The bolt was then rotated at 500 r.p.m. and pushed through the mixing resinous composition until the bolt had contacted the end of the hole. In this way the resinous composition was thoroughly mixed and displaced completely into the annular space between the wooden cylinder and the borehole. After 15 minutes had elapsed a tensile test load was applied to the protruding end of the bolt using a hollow cylinder hydraulic ram. The bolt failed at an applied load of 18.5 tons without detectable movement of the anchor end.

EXAMPLE 3

A steel bar three-fourths inch in diameter and 3 feet in length, was roll threaded each end for a length of 6 inches to form a bolt. A collar of filled, unsaturated polyester resin was cast to a length of 12 inches on to one end of the bolt. The filled unsaturated polyester resin was formed by addition to 30 percent by weight of styrene to 70 percent by weight of the condensation product of 2.2 mols of propylene glycol and a mixture of 1 mol of phthalic anhydride and 1 mol of maleic anhydride, the resin being filled with 65 percent by weight of a 1:1 mixture of fly-ash and limestone.

In order to cure the resin, 0.25 percent by weight of dimethylaniline was incorporated therein as accelerator whilst 2.0 percent by weight of benzoyl peroxide was dispersed in the resin just prior to casting. The final diameter of the encased bolt end was 38 mm. and the threaded end of the bolt was fully encased in the resin collar. The composite bolt thus formed was then inserted into a 43mm. diameter borehole in concrete, using a resinous cartridge of only 5 oz. weight of the type described in British Patent Specification No. 1,127,913. After 1 hour the bolt was subjected to a direct tensile load. No movement of the anchor bolt was detectable and the bolt finally broke at the unbonded threaded end at a load of 20 tons.

EXAMPLE 4

A three-fourths inch steel bar 6 feet in length was roll threaded for a length of 6 inches at each end to form a bolt. A resin collar 5½ feet long and 36mm. in outside diameter wsa cast on to the bolt from one extremity, so that one 6 inch threaded length of bolt protruded from the collar. The collar was cast from a filled, unsaturated polyester resin similar to that described in Example 3 except that 78 percent by weight of limestone dust (85 percent of which passed through a 200 mesh B.S.S.

sieve) was used as the sole filler. This composite bolt was inserted into a 43mm. diameter borehole, drilled into soft shale adjacent to a coal seam, using three resinous cartridges, each of 1½ lbs. weight. In this fashion the bolt was fully bonded into the borehole over its whole inserted length and only 6 inches of unbonded thread remained projecting from the surface of the rock. After 40 minutes curing time, a tensile load was applied to the projecting thread and progressively increased. No detectable movement occurred up to a load of 11½ tons, corresponding to the yield point of the steel. Beyond that point, progressive elongation of the steel bolt occurred as the load was progressively increased. The bolt ultimately failed in the exposed threaded end at a load of 17½ tons after total bolt extension of 5½ inches.

We claim:

1. A method of securing a longitudinally extending fixing element in a borehole having a diameter at least 10 mm. greater than that of the fixing element, in which a resinous composition packaged in at least one frangible cartridge and positioned within the borehole is used to secure the fixing element in the borehole, characterised in that to reduce the amount of resinous composition required to secure the fixing element in the borehole, at least that part of the fixing element which is to be secured in the borehole is provided with at least one non-expandable longitudinally extending collar formed from an essentially non-deformable material which reduces the volume of the annular space between the fixing element and the wall of the borehole.

2. A fixing element suitable for use in a method of securing a longitudinally extending fixing element in a borehole having a diameter at least 10 mm. greater than that of the fixing element, in which a resinous composition packaged in at least one frangible cartridge and positioned within the borehole is used to secure the fixing element in the borehole, said fixing element comprising a first end portion capable of being rotated by a drill, a second end portion capable of destroying said frangible cartridge in the borehole, and a shank joining said first and second end portions together, at least part of said shank being provided with at least one non-expandable longitudinally extending collar formed from an essentially non-deformable material.

3. A fixing element as claimed in claim 2, wherein at least that part of the shank which is adjacent to said second end portion has a longitudinally extending collar.

4. A fixing element as claimed in claim 2, wherein the collar is loosely fitted on the shank.

5. A fixing element as claimed in claim 2, wherein the collar is bonded to, or immovably fitted on, the shank.

6. A fixing element as claimed in claim 2, wherein the collar is solid.

7. A fixing element as claimed in claim 2, wherein the collar is hollow.

8. A fixing element as claimed in claim 2, wherein the collar is of substantially uniform cross-sectional area.

9. A fixing element as claimed in claim 3, wherein the collar extends further than said adjacent part of the shank and wherein the collar is of decreased cross-sectional area in said adjacent part compared with the remainder of the shank.

10. A fixing element as claimed in claim 2, wherein the collar is tapered towards said second end portion of the fixing element.

11. A fixing element as claimed in claim 2, wherein the shank is of substantially circular cross-section.

12. A fixing element as claimed in claim 11, wherein the shank is a steel bar.

13. A fixing element as claimed in claim 11, wherein the shank is a rod of reinforced plastics material.

14. A fixing element as claimed in claim 13, wherein the shank is a rod of glass fibre reinforced polyester resin.

15. A fixing element as claimed in claim 2, wherein the shank is formed of wood and the collar is formed of reinforced plastics material.

16. A fixing element as claimed in claim 15, wherein the collar is formed of glass fibre reinforced polyester resin.

17. A fixing element as claimed in claim 2, wherein the collar is formed integrally with the shank.

18. A fixing element as claimed in claim 17, whereiin the collar is cast on to the shank from a castable synthetic resin and at least part of the shank is deformed or provided with a screw-thread so as to ensure in use adequate load transfer between the shank and the collar.

19. A fixing element as claimed in claim 2, wherein the shank has a cross-section other than circular.

20. In a borehole, a fixing element as claimed in claim 2 secured in the borehole by a resinous composition in the annular space between the collar and the wall of the borehole, the diameter of the borehole being at least 10 mm. greater than that of said shank.

* * * * *